(No Model.)

F. H. MOORE.
APPARATUS FOR PURIFYING WATER.

No. 424,124. Patented Mar. 25, 1890.

Witnesses

Inventor.
Frederic H. Moore
by Edwin Planta
Attorney.

United States Patent Office.

FREDERIC H. MOORE, OF BOSTON, MASSACHUSETTS.

APPARATUS FOR PURIFYING WATER.

SPECIFICATION forming part of Letters Patent No. 424,124, dated March 25, 1890.

Application filed November 22, 1889. Serial No. 331,216. (No model.)

*To all whom it may concern:*

Be it known that I, FREDERIC H. MOORE, a citizen of the United States, residing at Boston, in the county of Suffolk and State of Massachusetts, have invented certain new and useful Improvements in Apparatus for Purifying Water, of which the following, taken in connection with the accompanying drawings, is a specification.

My invention relates to certain improvements in apparatus for purifying water, and has especial reference to an apparatus for which Letters Patent were granted to me the 17th day of September, 1889, and numbered 411,292.

The object of my present invention is the more perfect aeration of the distilled water as it passes through the aerator and to render the same as pure as may be; and the invention consists of certain details of construction, as hereinafter fully described, and pointed out in the claims.

Figure 1:
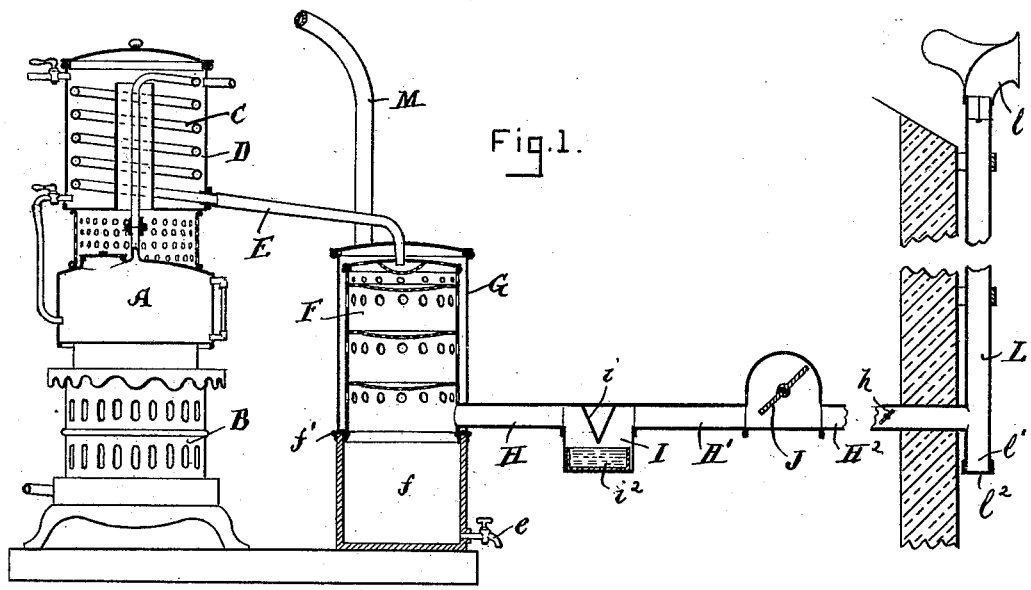
Figure 2:
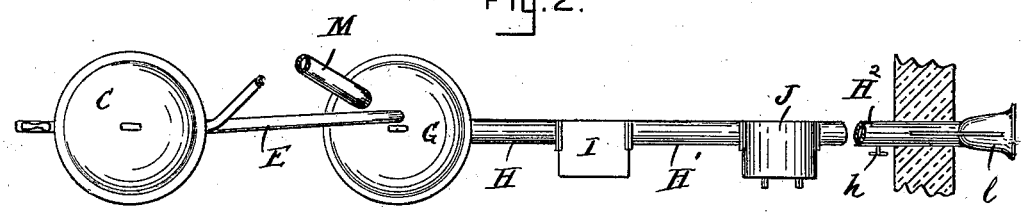
Figure 3:
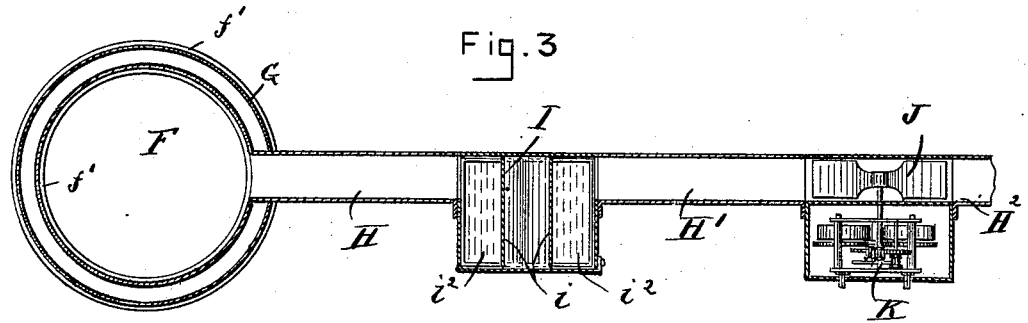

Referring to the accompanying drawings, Figure 1 represents a longitudinal vertical section through a water-purifying apparatus embodying my invention. Fig. 2 is a plan or top view of the same on a line with the aerator. Fig. 3 is a horizontal section drawn to a larger scale of a portion of the apparatus.

A represents a boiler supported and heated by a stove B.

C is a worm or coil in a condensing-vessel D.

E is a pipe connecting the worm with an aerating-vessel F, consisting of a cylindrical vessel provided with a series of perforated shelves and having in its wall a number of holes between the shelves, all of which may be constructed and arranged as described in the specification of my patent before referred to; but I prefer to make the aerating-vessel in two parts, the lower portion $f$ forming a water-reservoir and provided with a stop-cock $e$, and at its upper end being fitted with a cap $f'$, upon which the upper portion, containing the perforated shelves, rests. I prefer to make the reservoir, aerator, and perforated shelves of glass or earthenware.

Around the upper portion of the aerating-vessel F, I place a casing G, the lower end of which rests upon the cap $f'$.

Connected to the lower portion of the aerating-vessel F is a pipe H, that leads to a dust-extractor I, which is connected by a pipe H′ to a fan J, that is connected by a pipe $H^2$ to a pipe L on the outside of the building. The upper end of pipe L is fitted with a cowl $l$ or other suitable device for admitting air to the pipe, and its lower end is provided with a chamber $l'$, in which dust, dirt, or other extraneous substance will be collected. The lower end of this chamber is fitted with a cap $l^2$, which can be taken off to remove any accumulations in said chamber. The fan J, I have shown as being driven by clock-work K; but it might be driven by an electric or other suitable motor, and in the pipe $H^2$ is fitted a damper $h$, so that the supply of air may be regulated or cut off altogether, if desired.

The dust-extractor I consists of a hollow casing provided at its upper end with a deflector $i$. A pan $i^2$, filled with water, rests upon the bottom, the lower edge of the deflector being below the line of the pipes H H′ and nearly touching the water in the pan $i^2$, so that the air, as it is forced through the pipe H′, strikes the deflector $i$ and is thrown down and passes over the surface of the water in the pan $i^2$, and any dust or dirt will be retained by the water. The front of the extractor I is fitted with a door, so that the pan $i^2$ can be removed and cleansed or filled with water, as may be required.

To the top of the casing G is secured a pipe M, which may lead to a flue, chimney, or other convenient place, so that the superfluous air can pass off from the aerating-chamber. Said pipe also naturally aids the inflow of the external air.

The operation is as follows: The stove B being lighted, the water in the boiler A is converted into steam which passes through the coil C, where it is condensed, and is delivered by the pipe E to the aerating-vessel F. The fan J is then set in motion and draws the air down the pipe L and forces it through the pipe H′, dust-extractor I, and pipe H to the aerating-vessel F, through which it passes and commingles with the water as it passes through. The superfluous air then passes off by the pipe M to a flue or chimney.

It is obvious that instead of the casing G being made to fit over the upper portion of the aerating-vessel it might be made in the form of a cabinet and sufficiently large to inclose the whole of said vessel, the dust-receiver I, and the fan J.

What I claim as my invention is—

1. In a water-purifying apparatus, an aerating-vessel having openings in its outer wall and fitted with a series of perforated plates, a condenser connected thereto, an outer casing inclosing the aerating-vessel, a pipe for admitting atmospheric air from the outside of the building to the lower portion of the aerating-vessel, which air commingles with the water from the condenser as it passes through the aerating-vessel, and a pipe or opening for the escape of the air from the outer casing, substantially as set forth.

2. In a water-purifying apparatus, an aerating-vessel having openings in its outer wall and fitted with a series of perforated plates, a condenser connected therewith, an outer casing inclosing the aerating-vessel, a pipe for admitting atmospheric air from the outside of the building to the lower portion of the aerating-vessel, a deflector or dust-extractor situated in said pipe, and a pipe or opening for the escape of the air from the outer casing after it has passed through the aerating-vessel, substantially as set forth.

In testimony whereof I have signed my name to this specification, in the presence of two subscribing witnesses, on this 21st day of November, A. D. 1889.

FREDERIC H. MOORE.

Witnesses:
CHAS. STEERE,
EDWIN PLANTA.